US006455134B1

(12) United States Patent
Rabasco

(10) Patent No.: US 6,455,134 B1
(45) Date of Patent: Sep. 24, 2002

(54) INK JET MEDIA COMPRISING A COATING CONTAINING AMINE FUNCTIONAL EMULSION POLYMERS

(75) Inventor: John Joseph Rabasco, Macungie, PA (US)

(73) Assignee: Air Products Polymers, L.P., Allentown, PA (US)

( * ) Notice: Subject to any disclaimer, the term of this patent is extended or adjusted under 35 U.S.C. 154(b) by 0 days.

(21) Appl. No.: 09/383,853

(22) Filed: Aug. 26, 1999

(51) Int. Cl.[7] ................................................ B32B 27/14

(52) U.S. Cl. ....................... 428/195; 428/500; 428/522; 428/206

(58) Field of Search ................................ 428/195, 323, 428/331, 500, 522

(56) References Cited

U.S. PATENT DOCUMENTS

| | | | | |
|---|---|---|---|---|
| 4,801,497 A | * | 1/1989 | Kono et al. | 428/332 |
| 5,270,103 A | | 12/1993 | Oliver et al. | 428/219 |
| 5,570,120 A | * | 10/1996 | Sakaki et al. | 347/105 |

FOREIGN PATENT DOCUMENTS

| | | | |
|---|---|---|---|
| JP | 55125109 | 3/1979 | 20/34 |
| JP | 58185640 | 10/1983 | |
| JP | 59030827 | 2/1984 | |
| JP | 93067432 | 9/1993 | |

* cited by examiner

*Primary Examiner*—Bruce H. Hess
*Assistant Examiner*—Michael Grendzynjk
(74) *Attorney, Agent, or Firm*—Mary E. Bongiorno

(57) ABSTRACT

Improved ink jet paper coatings which impart high optical density images and excellent water resistance by the incorporation of an amine functional, colloid-stabilized emulsion into the coating formulation. The improvement resides in the use of amine functional monomers, such as 2-(dimethylamino)ethyl methacrylate (DMAEMA), which are emulsion copolymerized with other ethylenically unsaturated monomers, such as vinyl acetate, in the presence of a large amount of a colloid stabilizing polymer having a plurality of pendent hydroxyl groups; preferably, poly(vinyl alcohol).

11 Claims, No Drawings

INK JET MEDIA COMPRISING A COATING CONTAINING AMINE FUNCTIONAL EMULSION POLYMERS

BACKGROUND OF THE INVENTION

Advances in ink jet technology have placed increased demands on recording papers. To function properly, the recording paper must quickly absorb the ink and ink vehicles directly after printing, maximize the ink optical density, minimize bleeding and wicking of the ink, and provide good water and light fastness. To obtain a paper with the above functions, the paper is usually treated with one or more coatings.

Ink jet paper coatings typically comprise silica pigment for its high absorption power and a polymeric binder, such as poly(vinyl alcohol), for its high binding strength. Non-silica pigments, such as clays, calcium carbonate, titanium dioxide, and aluminum hydrate, are also used. Other known polymeric binders include poly(vinylpyrrolidone), styrene-butadiene copolymers, poly(vinyl acetate), starch, and amine functional polymers such as amine functional poly (vinyl alcohol).

Amine functional poly(vinyl alcohol) is typically produced by the copolymerization of vinyl acetate with amine functional monomers, such as trimethyl-(3-methacrylamido-propyl)ammonium chloride, N-vinylformamide, or acrylamide, followed by saponification to form the poly (vinyl alcohol) derivative. However, there are disadvantages to this approach. The selection of amino comonomers is very limited due to their incompatibility with the saponification conditions to produce poly(vinyl alcohol). Depending on the monomer which is copolymerized with the vinyl acetate, saponification can have a deleterious effect on the comonomer. For example, when 2-(dimethylamino)ethyl methacrylate (DMAEMA) is the comonomer, saponification results in hydrolysis of the ester bond, thus removing the active amine functionality from the polymer backbone. Another disadvantage which limits the number of comonomers that can be used for the preparation of amine functional poly(vinyl alcohol) is the reactivity ratio of the comonomer with vinyl acetate. Depending on these reactivity ratios, there can be severe limitations not only on the level of amine monomer incorporation into the vinyl acetate copolymer, but also on the attainable range of copolymer molecular weights.

Another approach to producing amine functional poly (vinyl alcohol) involves post-reacting poly(vinyl alcohol) with amino synthons. For example, reacting aminobutyraldehyde dimethyl acetal (ABM) with the hydroxyl groups of poly(vinyl alcohol) to form the corresponding poly(vinyl alcohol) acetal or the free radical graft copolymerization of amine functional monomers, such as 2-(dimethylamino) ethylmethacrylate (DMAEMA), with poly(vinyl alcohol). Graft copolymerization provides some advantages over traditional copolymerization with vinyl acetate and subsequent saponification. For example, by using poly(vinyl alcohol) as a reactive synthon to graft polymerize other monomers, the saponification step is circumvented, thereby allowing the use of a much larger number of amine functional monomers and access to a wider range of amine functional poly(vinyl alcohol) compositions. One drawback of graft polymerization reactions is the simultaneous production of homopolymer or copolymers of the monomers being grafted, ultimately resulting in a blend of polymers.

Most of the commercially available amine functional polymers and amine functional poly(vinyl alcohol)s are either economically costly or, in the case of amine functional poly(vinyl alcohol)s, suffer from low levels of amine functionality. Those materials having low levels of amine functionality fail to meet the stringent performance requirements for good ink jet print quality, especially for the high-end, photographic grade ink jet papers. The printed image density and sharpness are inadequate, as is the water resistance. There are, therefore, continuing efforts to produce a high performing polymeric system improved print image density and sharpness and water resistance.

Poly(vinyl alcohol) is commonly used as an emulsion colloid stabilizer for poly(vinyl acetate) homopolymer, poly (vinyl acetate)-co-poly(ethylene) copolymers, and other ethylenically unsaturated polymers and copolymers that are used ink jet coating formulations. The colloid stabilizers are typically incorporated into emulsions at approximately 5 wt % relative to monomers. However, it is known to those practicing the art of ink jet paper coatings that higher levels of poly(vinyl alcohol) are necessary for proper and sufficient binding of pigments to the paper.

Examples of polymers containing amine functionality for use in paper applications are described below:

JP55-125109 (1980) discloses a water soluble high molecular weight composite material which is obtained by polymerizing water soluble ethylene type unsaturated monomers, such as alkylaminoalkyl acrylates or methacrylates, in the presence of a high molecular weight compound, such as starch, poly(ethylene glycol), and poly (vinyl alcohol), having at least one of the following functional groups: ether, hydroxy, and carboxy. The composite material is reported to exhibit good stability and fluidity and to be useful in a variety of areas; e.g., as a dye, paper-treating agent, and viscosity increasing agent.

JP 93-67432 (1993) (abstract) discloses an ink jet recording paper containing a formulation in base paper and/or coat layer and consisting of a copolymer of vinyl alcohol with a cationic monomer such as trimethyl-3-(1-acrylamidopropyl) ammonium chloride and non-colloidal silica powder.

JP 58-185640 and JP 59-030827 (abstracts) disclose the preparation of water dispersible cationic resin powders by emulsion polymerization of vinyl monomers in the presence of cationic poly(vinyl alcohol) emulsifiers or cationic comonomers. The resin powders, when dispersed in water, are reported to have good adherence and film forming property.

U.S. Pat. No. 5,270,103 (Oliver et al., 1993) discloses a receiver sheet which consists of a substrate and a coating containing a pigment and a binder. The binder comprises poly(vinyl alcohol) and an additional binder component; for example, a cationic polyamine, such as poly(2-hdyroxypropyl-1,1-N-dimethyl ammonium chloride), which is relatively insensitive to pH variations compared to other cationic polyamines, or a cationic polyacrylamide. The receiver sheet is particularly useful for printing with aqueous based inks such as in ink jet printing systems.

BRIEF SUMMARY OF THE INVENTION

This invention relates to improved ink jet paper coatings which impart high optical density images and excellent water resistance by the incorporation of an amine functional, colloid-stabilized polymer emulsion into the coating formulation. The improvement resides in the use of amine functional monomers, such as 2-(dimethylamino)ethyl methacrylate (DMAEMA), emulsion copolymerized with other ethylenically unsaturated monomers in a large amount of a colloid stabilizer. The colloid stabilizer is a polymer containing multiple pendent hydroxyl groups; poly(vinyl alcohol) is preferred.

It was found in this invention that emulsion polymerization of ethylenically unsaturated monomers with amine functional monomers, in the presence of a large amount of a colloidal polymer stabilizer having a plurality of pendent hydroxyl groups, such as poly(vinyl alcohol), offers further advantages over homogeneous aqueous graft copolymerization reactions. This invention employs at least 10 wt %, preferably at least 15 wt %, of colloid stabilizer to produce a unique emulsion copolymer system as a polymeric binder. By using large amounts of a hydroxyl containing colloid stabilizer, i.e., at least 10 wt %, more of the stabilizer is available for grafting reactions compared to traditional emulsion systems, thus affording a unique emulsion copolymer and resulting in a single polymeric ink jet paper binding system which provides excellent image quality, complete fixation of ink dyes to the paper under adverse humidity conditions, and high binding power of various pigments. Some advantages of the present emulsion polymerization approach to produce amine functional emulsion polymers are:

- the amine functional copolymer produced in emulsion form allows for the product to be prepared at a higher overall solids level compared to aqueous solution graft polymerization reactions;
- the higher achievable solids levels translates into lower processing costs and a lower cost product;
- the emulsion polymer provides the combined properties of a dye fixative polymer with the high binding strength of the hydroxyl containing polymer colloid stabilizer in one polymeric ink jet binder package;
- various ethylenically unsaturated monomers are easily incorporated into the amine functional, poly(vinyl alcohol) emulsion which serve to broaden the accessible polymer compositions and end-use performance features;
- the polymer morphology and property features are very different given the nature, size, distribution, and composition of the emulsion polymer particles; and,
- the uncharacteristically high levels of colloid stabilizer and water soluble amine functional polymers further alter the particle stabilization mechanism and the ultimate emulsion polymer properties.

The improved coated ink jet paper is prepared by:

- emulsion polymerizing an amine functional, ethylenically unsaturated monomer with one or more other copolymerizable ethylenically unsaturated monomer in an aqueous solution of a colloidal polymer stabilizer having a plurality of pendent hydroxyl groups, preferably, poly(vinyl alcohol), to form an amine functional emulsion polymer;
- incorporating the amine functional emulsion polymer into a slurry of one or more pigments to form a slurry formulation;
- coating a paper substrate with the slurry formulation; and
- drying the coated paper substrate.

There are several advantages to incorporating the above composition into ink jet paper coatings:

- an ability to prepare high quality ink jet recording paper with only one coating of the formulation;
- an ability to produce high quality ink jet paper which, when printed, gives high optical density images with regard to monochrome black, composite black, and primary colors;
- an ability to produce high quality ink jet paper which, when printed, yields waterfast images; and
- an ability to achieve fast ink dry times after printing onto ink jet paper coated with the formulation.

DETAILED DESCRIPTION OF THE INVENTION

The improved ink jet recording paper according to the present invention has a coating applied thereon which contains a polymeric binder comprising an emulsion polymer containing amine functional, ethylenically unsaturated monomers copolymerized with other ethylenically unsaturated monomers in the presence of large amounts of a colloid stabilizing polymer having a plurality of pendent hydroxyl groups. Large amounts of colloid stabilizing polymer are desirable in order to produce an emulsion polymer system composed of significant amounts of polymer grafted to the hydroxyl-containing polymer, and to obtain sufficient pigment binding power once the emulsion polymer system is incorporated into an ink jet recording paper coating composition. By large amounts of colloid stabilizing polymer are meant amounts which result in an emulsion polymer containing at least 10 wt %, preferably at least 15 wt %, hydroxyl-containing polymer.

Representative amine functional monomers which can be employed for grafting onto the hydroxyl containing polymer, include monoalkylaminoalkyl methacrylate, monoalkylaminoalkyl acrylate, dialkylaminoalkyl methacrylate, trialkylammoniumalkyl methacrylate, trialkylammoniumalkyl acrylate, or dialkylaminoalkyl acrylate, or dialkylaminoalkyl (meth)acrylamides. The alkyl groups of the above cited functional monomers can be substituted or unsubstituted $C_1$ to $C_6$groups. Alkylaminoalkyl methacrylates are preferred. Examples of appropriate monomers are 2-(dimethylamino)ethyl methacrylate, 2-(diethylamino) ethyl methacrylate, 2-(dimethylamino)ethyl acrylate, 3-(dimethylamino)-2,2-dimethylpropyl acrylate, 2-(diethylamino)ethyl acrylate, 2-(tertiary-butylamino) ethylmethacrylate, 2-(trimethylammonium)ethyl methacrylate chloride, 2-(trimethylammonium)ethyl acrylate chloride, 3-(dimethylamino)propyl methacrylamide, methacrylamidopropyl trimethylammonium chloride, diallyidimethylammonium chloride, vinylpyridine, allylamine, or combinations thereof.

Representative ethylenically unsaturated monomers which can be copolymerized with the amine functional, ethylenically unsaturated monomers in the above described emulsion polymer system, include vinyl acetate and other vinyl esters, styrene, various alkyl acrylates and alkyl methacrylates, hydroxyalkyl (meth)acrylates, various acrylamides and methacrylamides, N-methylolacrylamide, and combinations thereof. The alkyl groups can be substituted or unsubstituted $C_1$ to $C_6$ groups. Vinyl acetate is preferred.

Polymers having a plurality of pendent hydroxyl groups can be formed by the polymerization of vinyl or acrylic esters in which the ester unit contains from 1 to 4 carbon atoms. The pendent ester groups, when hydrolyzed, form polymers containing pendent hydroxyl groups. A preferred class of polymers having a plurality of pendent hydroxyl groups are based upon hydrolyzed vinyl acetate polymers wherein vinyl acetate is polymerized as a homopolymer or in conjunction with other monomers to form copolymers and are known as poly(vinyl alcohol) or vinyl alcohol copolymers. The mole percent of vinyl alcohol should be sufficient to enable free radical graft polymerization in an aqueous solution; i.e., render the polymer at least partially soluble in an aqueous medium. Typically the vinyl ester, specifically vinyl acetate, will comprise from 60 to 100% of the copolymer, preferably at least 90 mole percent of the polymer. The poly(vinyl alcohol) used in this invention, generally, has a weight average molecular weight ($M_w$) ranging from about 5,000 to 300,000; preferably 10,000 to 200,000. Alternatively, the poly(vinyl alcohol) can have a degree of polymerization (Dp) of from 100 to 5000, preferably 200 to 3500. Poly(vinyl alcohol) is made commercially by the hydrolysis of poly(vinyl acetate) and typically has a hydrolysis level ranging from about 85% to greater than 99%. For this invention, the level of hydrolysis can range from 70% to greater than 99%, preferably 85% to 98%. Mixed poly(vinyl alcohol) grades, using combinations of poly(vinyl alcohol)s varying in molecular weight and hydrolysis level, can also be employed in the present invention.

A variety of monomers may be copolymerized with a vinyl ester to produce polymers containing vinyl alcohol units. Monomers which can be polymerized with the vinyl ester, preferably vinyl acetate, include ethylene, unsaturated acids such as maleic, acrylic and methacrylic acid, and esters, such as the $C_1$ to $C_{12}$, preferably $C_1$ to $C_6$ alkyl esters of acrylic or methacrylic acid. In many instances, these polymers can be hydrolyzed to produce different grades of poly(vinyl alcohol) including, for example, hydrolyzing only the vinyl ester and leaving the acrylic ester functionality intact. Other monomers having from 2 to 12 carbon atoms such as alkyl maleates (e.g., dibutyl maleate and the like) may be polymerized as desired with vinyl acetate to control hydrophilic and hydrophobic content. Colloid stabilizing polymers which can be utilized in this invention are soluble in water.

The emulsion polymerization reaction can be conducted in an aqueous environment at a temperature necessary to liberate free radicals for the polymerization. Typical temperatures range from 30 to 90° C., preferably from 50 to 80° C. Reaction solids levels (ratio of total polymer to water) can vary from 5 to 60%, depending on the grade (e.g., molecular weight and hydrolysis level) of poly(vinyl alcohol) employed; preferably from 20 to 40%. Reaction times range from 1 to 5 hours. When amine functional acrylates and methacrylates are used for emulsion polymerization, the use of an equimolar amount of acid is preferred to reduce or eliminate the hydrolysis of the amino-ester moiety. Acceptable acids include acetic acid, sulfuric acid, phosphoric acid, hydrochloric acid, and the like. The emulsion polymerization can be conducted in a batch mode or a semi-batch mode. In a semi-batch mode, portions of the ethylenically unsaturated monomer and the amine functional monomer, with or without equimolar acid quantities, is added to an aqueous solution of poly(vinyl alcohol). A portion of the initiator is then added to the reaction mixture to initiate the emulsion polymerization. The remaining monomers are then introduced to the reaction mixture via two separate delay feeds and the remaining initiator is added via a third delay feed. Initiators which can be employed in this emulsion polymerization reaction include ammonium persulfate, sodium persulfate, potassium persulfate, tert-butylhydroperoxide, hydrogen peroxide, various azo initiators, and various redox initiation systems. Preferably, persulfate and peroxide initiators are used. The amount of initiator, based on amount of poly(vinyl alcohol), can range from 0.1 to 10 wt %; preferably 0.5 to 3.0 wt %.

Weight percent levels of amine monomers contained in the amine functional emulsion polymers of this invention can range from 1 to 70%, preferably from 10 to 55%. Weight percent levels of ethylenically unsaturated comonomers contained in the amine functional emulsion polymers of this invention can range from 20 to 89%, preferably from 30 to 75%. Weight percent levels of poly(vinyl alcohol) contained in the amine functional emulsion polymers of this invention can range from 10 to 79%, preferably from 15 to 60%.

The following table sets forth operative and preferred ranges regarding the preparation and use of the amine functional, poly(vinyl alcohol) stabilized emulsion:

TABLE 1

| | Operative Range | Preferred Range |
|---|---|---|
| Weight average molecular weight of poly(vinyl alcohol) | 5,000–300,000 | 10,000–200,000 |
| Acetate hydrolysis (mole %) | 70–>99 | 85–98 |
| Amine monomer content of emulsion (wt %) | 1–70 | 10–55 |
| Ethylenically unsaturated comonomer content of emulsion (wt %) | 20–89 | 30–75 |
| Colloid stabilizing polymer (e.g., poly(vinyl alcohol)) content of emulsion (wt %) | 10–79 | 15–60 |
| Wt % (solids basis) polymeric binder in coating | 5–90 | 10–50 |
| Coating pH | 3–10 | 4–8 |

Once the emulsion polymerization reaction is completed, the resulting amine functional emulsion polymer can be used directly in formulating the ink jet paper coating without further work-up, purification, or processing.

Ink jet coating formulations typically contain silica pigment having a surface area of 50 to 700 square meters per gram and possibly a small amount of another mineral pigment, such as aluminum silicate, clay, talc, calcium carbonate, magnesium silicate, and the like. The silica pigment is typically incorporated in the ink jet coating formulation in amounts ranging from about 1 to about 90% by weight, preferably 30 to 85% by weight. The polymeric binder level (solids basis) can range from 5 to 90% by weight of the ink jet formulation; preferably 10 to 50 wt %.

The level of pigment and emulsion polymer depend on the type of coater used in the preparation of the ink jet paper. For example a puddle size press application uses a low wt % of pigment relative to the emulsion polymer due to viscosity limitations in comparison to an air knife coater where pigment to binder ratio can be greater. Ink jet formulations can also contain conventional additives such as defoamers, surface active agents, dyes, ultraviolet absorbents, pigment dispersants, mold inhibitors, thickeners and water-resisting agents.

The ink jet formulation is usually applied to the paper surface in amounts ranging from about 2 to 20 grams per square meter; preferably, 3 to 15 grams/square meter. Coat weight varies depending on the type of coating applicator. For example a puddle size press may only apply a coat weight of 2 to 4 grams per square meter whereas an air knife can provide up to 10 grams per square meter.

Although any kind of paper can be used for application of ink jet coatings of this invention, uncoated wood free paper is preferred.

Not intending to be bound by theory, it is believed the amine group in the amine functional emulsion polymers provides a cationic charge on the paper surface which reacts with the anionic sulfonic acid groups of the direct or acid dye of the ink jet inks to form an insoluble salt. As such, the inks become waterfast on the paper surface. Pigment binding strength is also improved with the use of amine functional poly(vinyl alcohol) due to the strong absorption of the amines with the silanol groups on the silica pigment.

The invention will be further clarified by a consideration of the following examples, which are intended to be purely exemplary of the invention.

EXAMPLE 1

Semi-Batch Emulsion Polymerization of Vinyl Acetate, 2-(Dimethylamino)ethyl Methacrylate (DMAEMA), and Poly(vinyl alcohol)

Airvol® 523 (48 g, DP~1200, 88% hydrolyzed) poly (vinyl alcohol) was dissolved in 525 g of deionized water by stirring at 80 to 85° C. for 1 hour while purging the reactor with nitrogen. An aqueous solution of DMAEMA monomer was prepared by mixing 50 g of water and 12 g of glacial acetic acid and subsequently adding 32 g of DMAEMA monomer slowly to this solution with stirring. The initiator solution was prepared by dissolving 2.5 g of ammonium persulfate in 50 g of water. The reaction temperature was then lowered to 60° C. A portion of the DMAEMA solution (56 g) was added to the poly(vinyl alcohol) solution and mixed for 5 minutes. Vinyl acetate (48 g) was then added to the reaction mixture and mixed for 5 minutes. The polymerization was initiated by adding a portion of the ammonium persulfate solution (13 g) to the reactor. Once polymerization was initiated (20 to 45 minutes), the remaining DMAEMA solution (38 g) and remaining vinyl acetate (32 g) were added to the reaction mixture over a 60 minute delay feed period. The remaining ammonium persulfate solution (39.5 g) was added to the reactor over a 80 to 90 minutes delay feed period. The mixture was stirred for an additional 1 hour. After cooling to room temperature, the resulting emulsion is used without further work-up or purification for formulating the ink jet paper coatings.

EXAMPLE 2

Batch Emulsion Polymerization of Vinyl Acetate, 2-(Dimethylamino)ethyl Methacrylate (DMAEMA), and Poly(vinyl alcohol)

Airvol® 523 (48 g, DP~1200, 88% hydrolyzed) poly (vinyl alcohol) was dissolved in deionized water (525 g) by stirring at 80 to 85° C. for 1 hour while purging the reactor with nitrogen. An aqueous solution of DMAEMA monomer was prepared by mixing water (50 g) and glacial acetic acid (12 g) and subsequently adding DMAEMA monomer (32 grams) slowly to this solution with stirring. The initiator solution was prepared by dissolving ammonium persulfate (2.5 g) in water (50 g). The reaction temperature was then lowered to 60° C. The entire DMAEMA solution was then added to the poly(vinyl alcohol) solution and stirred for 5 minutes. Vinyl acetate (80 grams) was then added to the reaction mixture and stirred for 5 minutes. The polymerization was initiated by adding a portion of the ammonium persulfate solution (13 g). Once polymerization was initiated (20 to 45 minutes), the remaining ammonium persulfate solution was added to the reactor over a 1 hour period. Stirring was continued for another hour before cooling to room temperature. The resulting reaction mixture was used without further work-up or purification in formulating the paper coatings.

EXAMPLE 3

Semi-Batch Emulsion Polymerization of Methyl Methacrylate, 2-(Dimethylamino)ethyl Methacrylate (DMAEMA), and Poly(vinyl alcohol)

The procedure described in Example 1 was followed, except methyl methacrylate was used instead of vinyl acetate, and the entire DMAEMA solution was charged to the reactor along with 13 g of methyl methacrylate prior to initiating the emulsion polymerization.

EXAMPLE 4

Semi-Batch Emulsion Polymerization of Styrene, 2-(Dimethylamino)ethyl Methacrylate (DMAEMA), and Poly(vinyl alcohol)

The procedure described in Example 1 was followed, except styrene was used instead of vinyl acetate, and the entire DMAEMA solution was charged to the reactor along with 13 g of styrene prior to initiating the emulsion polymerization.

EXAMPLE 5

Semi-Batch Emulsion Polymerization of Vinyl Acetate, 2-(Dimethylamino)ethyl Methacrylate (DMAEMA), and Mixed Grades of Poly(vinyl alcohol)

A 13.7 wt% aqueous solution of Airvol® 523 (266 g, DP~1200, 88% hydrolyzed) poly(vinyl alcohol), a 19.3 wt% aqueous solution of Airvol® 205 (62.5 g, DP~500, 88% hydrolyzed) poly(vinyl alcohol), and water (245 g) was charged to a one-liter reactor and heated to 60° C. while purging the reactor with nitrogen. An aqueous solution of DMAEMA monomer was prepared by mixing water (50 g) and glacial acetic acid (12 g) and subsequently adding DMAEMA monomer (32 g) slowly to this solution with stirring. The initiator solution was prepared by dissolving ammonium persulfate (2.5 g) in water (50 g). The entire DMAEMA solution was added to the poly(vinyl alcohol) solution and mixed for 5 minutes. Vinyl acetate (13 g) was then added to the reaction mixture and mixed for 5 minutes. The polymerization was initiated by adding a portion of the ammonium persulfate solution (11 g) to the reactor. Once polymerization was initiated (20 to 45 minutes), the remaining vinyl acetate (67 g) was added to the reaction mixture over a 60 minute delay feed period. The remaining ammonium persulfate solution (41.5 g) was added to the reactor over a 80 to 90 minutes delay feed period. The resulting mixture was then stirred for an additional 1 hour. After cooling to room temperature, the resulting emulsion was used without further work-up or purification in formulating the ink jet paper coatings.

EXAMPLE 6

Semi-Batch Emulsion Polymerization of Vinyl Acetate, 2-(Trimethylammonium)ethyl Methacrylate Chloride, and Poly(vinyl alcohol)

A 14.4 wt% aqueous solution of Airvol® 523 (333 g, DP~1200, 88% hydrolyzed) poly(vinyl alcohol) and water (292 g) was charged to a one-liter reactor and heated to 60° C. while purging the reactor with nitrogen. The initiator solution was prepared by dissolving ammonium persulfate (2.5 g) in water (50 g). 2-(Trimethylammonium)ethyl methacrylate chloride (43 g of a 75% aqueous solution) was then charged to the reactor and stirred for 5 minutes. Vinyl acetate (13 g) was then added to the reaction mixture and mixed for 5 minutes. The polymerization was initiated by adding a portion of the ammonium persulfate solution (11 g) to the reactor. Once polymerization was initiated (20 to 45 minutes), the remaining vinyl acetate (67 g) is added to the reaction mixture over a 60 minute delay feed period. The remaining ammonium persulfate solution (41.5 g) was added to the reactor over a 80 to 90 minutes delay feed period. The resulting mixture was then stirred for an additional 1 hour. After cooling to room temperature, the resulting emulsion was used without further work-up or purification for formulating the ink jet paper coatings.

EXAMPLE 7

Emulsion Polymerization of Vinyl Acetate, 2-(Dimethylamino)ethyl Methacrylate (DMAEMA), and Poly(vinyl alcohol)

Airvol® 523 (48 g, DP~1200, 88% hydrolyzed) poly (vinyl alcohol) was dissolved in deionized water (475 g) by stirring at 80 to 85° C. for 1 hour while purging the reactor with nitrogen. An aqueous solution of DMAEMA monomer was prepared by mixing water (100 g) and glacial acetic acid (12 g) and subsequently adding DMAEMA monomer (32 g) slowly to this solution with stirring. The initiator solution was prepared by dissolving ammonium persulfate (2.5 g) in water (50 g). The reaction temperature was then lowered to 60° C. Vinyl acetate (80 g) was then added to the reaction mixture and stirred for 5 minutes. The DMAEMA solution was added to the reaction mixture via delay feed and the initiator solution was added to the reactor via a second delay feed. The polymerization was initiated by beginning both feeds simultaneously. The DMAEMA solution was added to the reactor over a 120 minute period and the initiator solution was added to the reactor over a 140 minute period. Stirring was continued for another hour before cooling to room temperature. The resulting reaction mixture was used without further work-up or purification for formulating the paper coatings.

EXAMPLE 8

Ink Jet Coating Preparation

Sheets of uncoated base paper were coated for the purpose of evaluating ink jet optical density for several colors and waterfastness. A paper coating dispersion was prepared by mixing 800 parts water, 100 parts silica pigment, and 40 parts (solids basis) of the amine functional, poly(vinyl alcohol) stabilized emulsion, prepared as described in the above examples. In preparing the coatings, a dispersion of silica pigment in water was prepared first followed by the addition of the amine functional, poly(vinyl alcohol) stabilized emulsion to this dispersion under high shear. The resulting dispersion was coated onto uncoated wood free paper having a basis weight of 40 $g/m^2$ at a coat weight of 7–8 $g/m^2$, using a Meyer Rod draw down bar. After coating and drying at 250° F. for 60 seconds, the sheets were printed with a Hewlett Packard 560 ink jet printer using an HP test pattern distributed by Hewlett Packard for the purpose of testing ink jet paper media. After printing, the samples were measured for optical density using a Tobias IQ 200 Reflection Densitometer. The waterfastness test was performed by first measuring the monochrome black ink density after printing. The printed area was then immersed in distilled water for 30 seconds with slight agitation and dried on a hot plate under tension. The optical density was then measured again.

Table 2 presents data on the ink optical density and water resistance of several ink jet coatings containing amine functional, poly(vinyl alcohol) stabilized emulsion binders and comparative examples utilizing a standard poly(vinyl alcohol) binder (sample 1), a poly(vinyl alcohol) stabilized poly(vinyl acetate) homopolymer emulsion (sample 2), and a commercial cationic poly(vinyl alcohol) binder (sample 13).

TABLE 2

| | | Ink Optical Density | | | | | |
|---|---|---|---|---|---|---|---|
| Sample | Polymeric Binder* | Monochrome Black | Magenta | Yellow | Cyan | Composite Black | Waterfastness[a] |
| 1 | Airvol ® 523 PVOH | 1.16 | 0.87 | 0.61 | 1.12 | 0.82 | 51.7 |
| 2 | 70% VAM/30% Airvol ® 523 | 0.92 | 0.86 | 0.59 | 1.09 | 0.70 | 48.0 |
| 3 | 50% VAM/20% DMAEMA/30% Airvol ® 523 | 1.33 | 091 | 0.61 | 1.16 | 0.94 | 0 |
| 4 | 50% Styrene/20% DMAEMA/30% Airvol ® 523 | 1.13 | 0.84 | 0.58 | 1.05 | 0.81 | 0 |
| 5 | 42.5% MMA/22.5% DMAEMA/35% Airvol ® 523 | 1.40 | 0.88 | 0.55 | 1.16 | 0.91 | 1 |
| 6 | 42.5% VAM/22.5% DMAEMA/35% Airvol ® 523 | 1.29 | 0.84 | 0.52 | 1.10 | 0.85 | 0 |
| 7 | 50% VAM/20% DMAEMA/30% Airvol ® 418 | 1.20 | 0.81 | 0.54 | 0.93 | 0.85 | 0 |
| 8 | 67% VAM/14% DMAEMA/19% Airvol ® 523 | 1.23 | 0.83 | 0.54 | 1.11 | 0.84 | 2.5 |
| 9 | 50% VAM/20% TMAEMA/30% Airvol ® 523 | 1.22 | 0.80 | 0.56 | 1.09 | 0.81 | 0 |
| 10 | 50% VAM/20% TBAEMA/30% Airvol ® 523 | 1.27 | 0.75 | 0.52 | 1.05 | 0.80 | 0 |
| 11 | 50% VAM/20% DADMAC/30% Airvol ® 523 | 1.20 | 0.77 | 0.53 | 1.03 | 0.78 | 1 |

TABLE 2-continued

| | | Ink Optical Density | | | | | |
|---|---|---|---|---|---|---|---|
| Sample | Polymeric Binder* | Monochrome Black | Magenta | Yellow | Cyan | Composite Black | Waterfastness[a] |
| 12 | 50% VAM/20% DMAEMA/22.5% Airvol ® 523/7.5% Airvol ® 205 | 1.20 | 0.81 | 0.56 | 0.96 | 0.83 | 0 |
| 13 | POVAL ® C-506 (cationic PVOH) | 1.23 | 0.95 | 0.64 | 1.23 | 0.91 | 45.5 |

PVOH: poly(vinyl alcohol). VAM: Vinyl acetate monomer. DMAEMA: 2-(dimethylamino)ethyl methacrylate. TMAEMA: 2-(trimethylammonium)ethyl methacrylate, chloride. Airvol ® 418 poly(vinyl alcohol): Dp~900; 92% hydrolyzed. TBAEMA: 2-(tertiary-butylamino)ethyl methacrylate. DADMAC: diallyldimethylammonium chloride. POVAL ® C-506 poly(vinyl alcohol): Cationic polyvinyl alcohol supplied by kuraray.
*All percentages are weight %.
[a]Loss (%) of monochrome black ink optical density upon 30 second water soak.

The data presented in Table 2 show that waterfastness is significantly improved with the use of several different amine functional, poly(vinyl alcohol) stabilized emulsion compositions compared to poly(vinyl alcohol) alone (sample 1), a poly(vinyl alcohol) stabilized poly(vinyl acetate) emulsion (sample 2), and a commercial cationic poly(vinyl alcohol) binder (sample 13). All of the amine functional, poly(vinyl alcohol) stabilized emulsion compositions (samples 3–12) display substantially better, if not complete, waterfastness and excellent optical ink densities.

What is claimed is:

1. A coated ink jet recording paper comprising a paper substrate coated with a formulation comprising a mineral pigment and an amine functional emulsion polymer comprising amine functional ethylenically unsaturated monomers emulsion copolymerized with other ethylenically unsaturated monomers in the presence of at least 10 wt % of a colloid stabilizing polymer having a plurality of pendent hydroxyl groups, based on the total weight of monomers and colloid stabilizing polymer.

2. The coated ink jet recording paper of claim 1 wherein the mineral pigment is silica, the colloid stabilizing polymer is poly(vinyl alcohol), the amine functional ethylenically unsaturated monomers are selected from the group consisting of monoalkylaminoalkyl methacrylate, monoalkylaminoalkyl acrylate, dialkylaminoalkyl methacrylate, trialkylammoniumalkyl methacrylate, trialkylammoniumalkyl acrylate, dialkylaminoalkyl acrylate, dialkylaminoalkyl acrylamide, dialkylaminoalkyl methacrylamide, and combinations thereof, and the other ethylenically unsaturated monomers are selected from the group consisting of a vinyl ester, styrene, an alkyl acrylate, an alkyl methacrylate, a hydroxyalkyl acrylate, a hydroxyalkyl methacrylate, an acrylamide, a methacrylamide, N-methylolacrylamide, and combinations thereof, wherein alkyl is a substituted or unsubstituted $C_1$ to $C_6$ alkyl.

3. The coated ink jet recording paper of claim 2 wherein the amine functional monomers are selected from the group consisting of 2-(dimethylamino)ethyl methacrylate, 2-(diethylamino)ethyl methacrylate, 2-(dimethylamino) ethyl acrylate, 3-(dimethylamino)-2,2-dimethylpropyl acrylate, 2-(diethylamino)ethyl acrylate, 2-(tertiary-butylamino)ethyl methacrylate, 2-(trimethylammonium) ethyl methacrylate chloride, 2-(trimethylammonium) ethyl acrylate chloride, 3-(dimethylamino)propyl methacrylamide, methacrylamidopropyl trimethylammonium chloride, diallyidimethylammonium chloride, vinylpyridine, allylamine, and combinations thereof, and the other ethylenically unsaturated monomers are selected from the group consisting of vinyl acetate, styrene, and methyl methacrylate.

4. The coated ink jet recording paper of claim 2 wherein the amine functional ethylenically unsaturated monomers are selected from the group consisting of monoalkylaminoalkyl methacrylate, dialkylaminoalkyl methacrylate, and trialkylammoniumalkyl methacrylate, and the other ethylenically unsaturated monomer is vinyl acetate.

5. The coated ink jet recording paper of claim 2 wherein the colloid stabilizing polymer is present at a level of 15 wt % or more.

6. The coated ink jet recording paper of claim 2 wherein the poly(vinyl alcohol) has a weight average molecular weight ranging from 5,000 to 300,000 and a degree of hydrolysis ranging from 70 to 99 mole %, and the amine functional emulsion polymer contains 1 to 70 wt % amine functional monomers and 20 to 89 wt % other ethylenically unsaturated monomers.

7. The coated ink jet recording paper of claim 2 wherein the poly(vinyl alcohol) a weight average molecular weight of ranging from 10,000 to 200,000 and a degree of hydrolysis of the poly(vinyl alcohol) ranging from 85 to 98 mole %, and the amine functional emulsion polymer contains 10 to 55 wt % amine functional monomers and 30 to 75 wt % other ethylenically unsaturated monomers.

8. The coated ink jet recording paper of claim 2 wherein the amine functional emulsion polymer is present in an amount, on a solids basis, of 10 to 50 wt % of the formulation and the silica is present in an amount of 30 to 85 wt % of the formulation.

9. A coated ink jet recording paper comprising a paper substrate coated with a formulation comprising silica and an amine functional emulsion polymer comprising an amine functional monomer selected from the group consisting of 2-(dimethylamino)ethyl methacrylate, 2-(diethylamino) ethyl methacrylate, 2-(dimethylamino)ethyl acrylate, 3-(dimethylamino)-2,2-dimethylpropyl acrylate, 2-(diethylamino)ethyl acrylate, 2-(tertiary-butylamino)ethyl methacrylate, 2-(trimethylammonium)ethyl methacrylate chloride, 2-(trimethylammonium)ethyl acrylate chloride, 3-(dimethylamino)propyl methacrylamide, methacrylamidopropyl trimethylammonium chloride, diallyldimethylammonium chloride, vinylpyridine, and allylamine, emulsion copolymerized with an other ethylenically unsaturated monomer selected from the group consisting of a vinyl ester, styrene, and methyl methacrylate, in the presence of large amounts of poly(vinyl alcohol).

10. The coated ink jet recording paper of claim 9 wherein the amine functional monomer is selected from the group consisting of 2-(dimethylamino)ethyl methacrylate, 2-(diethylamino)ethyl methacrylate, 2-(tertiary-butylamino) ethyl methacrylate, and 2-(trimethylammonium)ethyl methacrylate chloride, the other ethylenically unsaturated monomer is vinyl acetate, and the poly(vinyl alcohol) is present in an amount of 15 wt % or more, based on the total weight of monomers and poly(vinyl alcohol).

11. The coated ink jet recording paper of claim 9 wherein the poly(vinyl alcohol) has a weight average molecular weight ranging from 10,000 to 200,000 and a degree of hydrolysis ranging from 85 to 98 mole %, and is present in an amount ranging from 15 to 60 wt % of the amine functional emulsion polymer, the amine functional monomer is present in an amount ranging from 10 to 55 wt % of the amine functional emulsion polymer, the other ethylenically unsaturated monomer is present in an amount ranging from 30 to 75 wt % of the amine functional emulsion polymer, and the silica is present in an amount of 30 to 85 wt % of the formulation.

* * * * *

UNITED STATES PATENT AND TRADEMARK OFFICE

CERTIFICATE OF CORRECTION

PATENT NO. : 6,455,134 B1
DATED : September 24, 2002
INVENTOR(S) : John Joseph Rabasco It is certified that error appears in the above-identified patent and that said Letters Patent is hereby corrected as shown below:

Title page, Item [54] and Column 1, line 1,
Delete the words "MEDIA COMPRISING A COATING" and insert therefore
-- PAPER COATINGS --.

Signed and Sealed this

Tenth Day of December, 2002

JAMES E. ROGAN
*Director of the United States Patent and Trademark Office*